US008374927B2

(12) United States Patent
Roberts et al.

(10) Patent No.: US 8,374,927 B2
(45) Date of Patent: *Feb. 12, 2013

(54) METHODS FOR WIRELESSLY ROUTING A VEHICLE

(75) Inventors: Ralph L. Roberts, Reddick, FL (US); Steve F. Naghshineh, Cincinnati, OH (US)

(73) Assignee: R & L Carriers, Inc., Wilmington, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/289,248

(22) Filed: Nov. 4, 2011

(65) Prior Publication Data

US 2012/0047086 A1   Feb. 23, 2012

Related U.S. Application Data

(60) Continuation of application No. 11/950,522, filed on Dec. 5, 2007, now Pat. No. 8,065,205, which is a division of application No. 10/097,828, filed on Mar. 14, 2002, now abandoned, which is a continuation-in-part of application No. 09/542,682, filed on Apr.

(Continued)

(51) Int. Cl.
*A01K 5/02* (2006.01)
*G06Q 30/00* (2006.01)
*G06Q 10/00* (2006.01)
(52) U.S. Cl. ............... 705/29; 705/330; 705/28
(58) Field of Classification Search .............. None
See application file for complete search history.

(56) References Cited

U.S. PATENT DOCUMENTS

| | | | |
|---|---|---|---|
| 3,711,862 A | 1/1973 | Story | |
| 3,979,731 A | 9/1976 | Naplatanov et al. | |
| 4,360,875 A | 11/1982 | Behnke | |
| 4,799,156 A | 1/1989 | Shavit et al. | |
| 4,832,204 A | 5/1989 | Handy et al. | |
| 4,888,692 A | 12/1989 | Gupta et al. | |
| 5,051,914 A | 9/1991 | Sansone et al. | |
| 5,122,959 A | 6/1992 | Nathanson et al. | |
| 5,142,278 A | 8/1992 | Moallemi et al. | |
| 5,168,444 A * | 12/1992 | Cukor et al. | 705/330 |
| 5,168,451 A | 12/1992 | Bolger | |
| 5,265,006 A | 11/1993 | Asthana et al. | |
| 5,272,324 A | 12/1993 | Blevins | |
| 5,278,750 A | 1/1994 | Kaneko et al. | |
| 5,333,177 A | 7/1994 | Braitberg et al. | |
| 5,442,810 A | 8/1995 | Jenquin | |
| 5,479,479 A | 12/1995 | Braitberg et al. | |

(Continued)

FOREIGN PATENT DOCUMENTS

DE   29700373   3/2009
WO   W098/40837   9/1998

OTHER PUBLICATIONS

Business Wire, "HighwayMaster Unveils Portable Version of Their Award-Winning Mobile Communications System," Mar. 20.

(Continued)

*Primary Examiner* — Mussa A Shaawat
(74) *Attorney, Agent, or Firm* — Dinsmore & Shohl LLP

(57) ABSTRACT

The present invention automates the process of receiving transportation documentation and producing advance loading manifests therefrom to optimize load planning and dynamic product shipment and delivery control. Methods provide for receipt of the transportation documentation, initial preparation, and transmission of the documentation from on board a vehicle or while the vehicle is in transit.

8 Claims, 9 Drawing Sheets

Related U.S. Application Data 3, 2000, now Pat. No. 6,401,078, which is a continuation-in-part of application No. 09/283,032, filed on Apr. 1, 1999, now abandoned.

(60) Provisional application No. 60/080,365, filed on Apr. 1, 1998.

U.S. PATENT DOCUMENTS

| | | | |
|---|---|---|---|
| 5,485,369 | A | 1/1996 | Nicholls et al. |
| 5,528,489 | A | 6/1996 | Asahara et al. |
| 5,535,274 | A | 7/1996 | Braitberg et al. |
| 5,539,810 | A | 7/1996 | Kennedy et al. |
| 5,594,425 | A | 1/1997 | Ladner et al. |
| 5,678,196 | A | 10/1997 | Doyle |
| 5,724,243 | A | 3/1998 | Westerlage et al. |
| 5,732,074 | A | 3/1998 | Spaur et al. |
| 5,799,249 | A | 8/1998 | Kennedy et al. |
| 5,818,528 | A | 10/1998 | Roth et al. |
| 5,821,518 | A | 10/1998 | Sussmeier et al. |
| 5,822,427 | A | 10/1998 | Braitberg et al. |
| 5,857,029 | A | 1/1999 | Patel |
| 5,880,958 | A | 3/1999 | Helms et al. |
| 5,892,441 | A | 4/1999 | Woolley et al. |
| 5,910,896 | A | 6/1999 | Hahn-Carlson |
| 5,940,117 | A * | 8/1999 | Hassan et al. ............... 725/115 |
| 5,969,321 | A | 10/1999 | Danielson et al. |
| 5,974,356 | A | 10/1999 | Doyle et al. |
| 5,987,377 | A * | 11/1999 | Westerlage et al. ........... 701/454 |
| 6,006,159 | A * | 12/1999 | Schmier et al. ............... 701/465 |
| 6,026,292 | A | 2/2000 | Coppinger et al. |
| 6,075,458 | A | 6/2000 | Ladner et al. |
| 6,084,528 | A | 7/2000 | Beach et al. |
| 6,084,870 | A | 7/2000 | Wooten et al. |
| 6,108,591 | A | 8/2000 | Segal et al. |
| 6,122,514 | A | 9/2000 | Spaur et al. |
| 6,124,810 | A | 9/2000 | Segal et al. |
| 6,154,658 | A | 11/2000 | Caci |
| 6,253,129 | B1 | 6/2001 | Jenkins et al. |
| 6,285,916 | B1 | 9/2001 | Kadaba et al. |
| 6,304,856 | B1 | 10/2001 | Soga et al. |
| 6,317,668 | B1 | 11/2001 | Thibault |
| 6,331,825 | B1 | 12/2001 | Ladner et al. |
| 6,341,218 | B1 | 1/2002 | Poplawsky et al. |
| 6,354,493 | B1 | 3/2002 | Mon |
| 6,363,323 | B1 * | 3/2002 | Jones ............................ 701/468 |
| 6,377,357 | B1 | 4/2002 | Sato et al. |
| 6,377,825 | B1 | 4/2002 | Kennedy et al. |
| 6,411,891 | B1 * | 6/2002 | Jones ............................ 701/465 |
| 6,421,590 | B2 | 7/2002 | Thibault |
| 6,430,164 | B1 | 8/2002 | Jones et al. |
| 6,516,192 | B1 | 2/2003 | Spaur et al. |
| 6,526,341 | B1 | 2/2003 | Bird et al. |
| 6,571,213 | B1 | 5/2003 | Altendahl et al. |
| 6,634,551 | B2 | 10/2003 | Barta et al. |
| 6,643,319 | B1 | 11/2003 | Suzuki et al. |
| 6,785,718 | B2 | 8/2004 | Hancock et al. |
| 6,810,235 | B2 | 10/2004 | Smith et al. |
| 6,816,090 | B2 | 11/2004 | Teckchandani et al. |
| 6,879,962 | B1 | 4/2005 | Smith et al. |
| 6,898,435 | B2 | 5/2005 | Milman |
| 6,902,109 | B2 | 6/2005 | Barta et al. |
| 6,922,133 | B2 | 7/2005 | Wolfe |
| 6,957,197 | B1 | 10/2005 | Altendahl et al. |
| 6,970,825 | B1 | 11/2005 | Altendahl et al. |
| 6,990,336 | B2 | 1/2006 | Parisi |
| 7,065,347 | B1 | 6/2006 | Vikse et al. |
| 7,212,984 | B2 | 5/2007 | Wolfe et al. |
| 7,242,279 | B2 | 7/2007 | Wolfe |
| 7,327,250 | B2 | 2/2008 | Harvey |
| 7,346,370 | B2 | 3/2008 | Spaur et al. |
| 7,366,892 | B2 | 4/2008 | Spaur et al. |
| 7,401,030 | B1 | 7/2008 | Mather et al. |
| 2002/0007302 | A1 | 1/2002 | Work et al. |
| 2002/0055817 | A1 | 5/2002 | Chou |
| 2002/0073170 | A1 | 6/2002 | Hoffman et al. |
| 2003/0004747 | A1 | 1/2003 | Burton |
| 2003/0013481 | A1 | 1/2003 | Vassilovski et al. |
| 2003/0114206 | A1 | 6/2003 | Timothy et al. |
| 2004/0084519 | A1 | 5/2004 | Barta et al. |
| 2004/0211834 | A1 | 10/2004 | Fleckenstein et al. |
| 2004/0215480 | A1 | 10/2004 | Kadaba |
| 2005/0006470 | A1 | 1/2005 | Mrozik et al. |
| 2005/0065678 | A1 | 3/2005 | Smith et al. |
| 2005/0085963 | A1 | 4/2005 | Kapolka et al. |
| 2005/0119786 | A1 | 6/2005 | Kadaba |
| 2007/0152802 | A1 | 7/2007 | Knoll et al. |
| 2008/0064420 | A1 | 3/2008 | Aldern et al. |

OTHER PUBLICATIONS

Wendy Leavitt, Fleet Owner, "The Convergence Zone", Jun. 1, 1998.

Christy Doering, Business Wire, "HighwayMaster Introduces Fax Interface Capabilities", May 15, 1996.

Highway Master Communication 10-K, SEC filing on Dec. 31, 1997.

Defendant's Invalidity Contentions and Disclosures Under Local Patent Rules 103.4 and 103.5 as filed in in re Bill of Lading Transmission and Processing System Patetn Litigation—*R+L Carriers, Inc. v. Affiated Computer Services, Inc., et al*, Civil Action No. 1:09-MD-2050-SSB in the USDC; S.D. Ohio, Western Division, filed Feb. 26, 2010.

Hall et al, Organizing for ITS: Computer Integrated Transportation Phase 2: Results for Commercial Vehicle Operators, Path Research Report, Institute of Transportation Studies, University of California at Berkley (1995).

Hall et al, Commercial Vehicle Operations in Intermodular Transportation Management Centers, Path Research Report, Institute of Transportation Studies, University of California at Berkley (1997).

Bradley, The Quiet Revolution in Trucking Services, Purchasing (Mar. 4, 1993).

Highway Master Communications, Inc. Annual Report (Mar. 1997).

Presenting a New Image—2D Bar Code Speeds Delivery and Promises to Cut Costs, Realtime (Spring 1999).

Scapinakis et al, Communications and Positions in the Motor Carrier Industry, Path Research Report, Institute of Transportation Studies, University of California at Berkley (Jan. 1992).

Hall et al, On the Road to Efficiency, OR/MS (Jun. 1997).

N&M Transfer Company—evidence of prior art for in-cab faxing of bills of lading for the advance generation of a manifest while a package was being transported, produced by Defendent in Civil Action No. 1:09-MD-2050-SSB in the USDC; S.D. Ohio, Western Division.

Metanetics Corp.—evidence of prior art for in-cab faxing of bills of lading to a dispatcher for incorporation into fleet management software, produced by Defendant in Civil Action No. 1:09-MD-2050-SSB in the USDC; S.D. Ohio, Western Division.

Highway Master Communications, Inc.—evidence of prior art for a system that included in-cab faxing of bills of lading to a dispatcher for incorporation into fleet management software, produced by Defendant in Civil Action No. 1:09-MD-2050-SSB in the USDC; S.D. Ohio, Western Division.

Highway Master Communications, Inc.—evidence of prior art for in-cab faxing of bills of lading to a dispatcher for incorporation into fleet management software and offer for sale, produced by Defendant in Civil Action No. 1:09-MD-2050-SSB in the USDC; S.D. Ohio, Western Division.

Highway Master Communications, Inc.—Website—www.highwaymaster.com, (1998).

* cited by examiner

METHODS FOR WIRELESSLY ROUTING A VEHICLE

CROSS-REFERENCES TO RELATED APPLICATIONS

The present application is a continuation of co-pending U.S. patent application Ser. No. 11/950,522, filed Dec. 5, 2007, which is a divisional of U.S. patent application Ser. No. 10/097,828 filed Mar. 14, 2002, now abandoned, which is a continuation-in-part of U.S. Pat. No. 6,401,078, filed Apr. 3, 2000, which is a continuation-in-part of U.S. patent application Ser. No. 09/283,032 filed Apr. 1, 1999, now abandoned, which claims the benefit of U.S. Provisional Patent Application Ser. No. 60/080,365 filed Apr. 1, 1998, the entire disclosures of which are hereby incorporated herein by reference.

BACKGROUND OF THE INVENTION

1. Field of the Invention

The present invention relates generally to methods of dynamic load planning and billing used by less-than-a-load (LTL) carriers and more particularly, to a method for transmitting shipping documents or bills of lading directly from the truck driver to a common point or terminal so that billing and load planning can be accomplished while the load is being delivered from the customer.

2. General Background

The shipping industry consists primarily of three types of carriers, each offering services that satisfy different customer needs. There are small package carriers like Federal Express, United Parcel Service and others who pick up small packages, consolidate these packages into large loads, move them close to their destination point and then deliver the packages. At the opposite end of the shipping business are the large customers which fill entire trucks or trailer loads and are considered to be truck load shippers. The category in between the truck load shippers and the small package shippers are less-than-a-load (LTL) carriers. Similar to the UPS driver who collects and delivers many small packages during a business day, the less-than-a-load (LTL) carrier picks up freight from upwards of 20 different customers. This freight is typically destined to many different locations around the country. The freight is brought back to a terminal where the shipments are unloaded from the truck, consolidated with other freight moving in the same direction and then reloaded on delivery trucks. The freight is sorted and consolidated into truck loads at the terminal to minimize the empty space on the truck that will transport the freight from the local terminal to either a local delivery or a distribution terminal in another city or state. At the distribution terminal the truck will be unloaded and its freight restored and reconsolidated for delivery to customers in the local area around the distribution terminal or shipment to another distribution terminal.

Each individual shipment is governed by a separate contract called a "bill of lading". Often, customers will have their own bill of lading form that they use for shipping. Thus, over the course of a day a truck driver may collect many different bill of lading forms, one for each shipment. As in any business, efficiency and speed are measuring sticks for customer service. As an internal matter, as with any other business, the faster payment is received, the better the cash flow. The speed and efficiency of these processes are what gives a trucking or other carrier a competitive edge. Typically, a truck driver will leave the truck terminal in the morning and return in the evening. When he returns he has a hand full of bill of lading forms and other paper work which is submitted to the corporate office where it is processed by billing clerks using data entry skills. After the information from each bill of lading is entered, the shipping information is transmitted to the loading dock at the terminal so that the freight moving to common points can be consolidated and the delivery schedule planned.

The goal of proper load planning is to deliver the freight on time with the delivery truck leaving the terminal with a full load. Unfortunately, both the truck used to pick up the freight and the truck used to deliver the freight are often sitting idle at the terminal while the data entry and load planning functions are being performed. Additionally, because the freight typically comes in one truck at a time the loading dock may not know in advance of the trucks' arrival at the terminal or the contents and the destination of the freight picked up on a given day. Consequently, a delivery truck will often depart the terminal only partially loaded. Many of these partially loaded trucks could have been fully loaded had the load planner known about unscheduled freight that had been picked up and would soon arrive at the terminal. This movement of freight as partial also results in decreased efficiency, increased costs and reduced profits for the trucking company.

Computer software has been developed to perform load and shipping planning functions. U.S. Pat. No. 5,265,006 titled "DEMAND SCHEDULED PARTIAL CARRIERS LOAD PLANNING SYSTEM FOR THE TRANSPORTATION INDUSTRY" is an example of this type of software. Load planning software, while reducing the time expended in planning shipments, is unable by itself to reduce the inefficiency caused by partial loads that could have been full loads due to unscheduled freight, since this freight would not have been entered into the computer program.

U.S. Pat. No. 5,168,444 (Cukor), titled "SHIPMENT SYSTEM INCLUDING PROCESSING OF DOCUMENT IMAGES", illustrates a system where the bills of lading are faxed from local shipping terminals to the shipping company's headquarters. At headquarters, where the data entry clerks could be supervised, a data entry clerk views the image of the bill of lading and enters the appropriate information in to the billing and accounting database. This system while using a fax machine, still requires that the truck driver return to a terminal before the shipping documents are sent to the company headquarters. Thus, while this system may reduce the errors made by the data entry personnel, it does not reduce the inefficiencies caused by the data entry clerks waiting for a driver to arrive at a terminal with the bills of lading and fax the bills of lading to headquarters, or the inefficiency caused by the driver waiting for the load planning to be completed.

SUMMARY OF THE INVENTION

The present invention has solved the problems described above and comprises broadly a system for transmitting bills of lading to a central facility so that billing and load planning may be accomplished while the freight is en route to a terminal, the equipment used to transmit the bill of lading from the driver to a terminal or central location, and the method for transmitting the bill of lading. There is a document input system that provides for scanning the paper bill of lading into an electronic data format or electronic bill of lading. Connected to the input system is a document transmitting system. The transmitting system transmits the electronic bill of lading to a document receiving system using a communications link. The document receiving system is connected to a document processing system. This processing system provides for the display and printing of the electronic bill of lading; for sharing the electronic bill of lading over a network; and for extracting load planning and billing information from the electronic bill of lading. The load planning data is sent to a load planner or to load planning software and the billing data is sent to a load planner or to load planning software and the billing data is sent to the billing clerk or accounting/billing software application. With this information in the computer system, the customer can now be billed as well as appropriate load planning can be accomplished, so that when the truck driver returns to the terminal the load planning is completed. Thus, each freight shipment can be unloaded from the truck and directly placed on the truck that will be carrying that load to its next destination. Having the load planning accomplished prior to the freight's arrival, reduces the freight turn-around time and freight handling. Additionally, since the load planner knows what freight is on its way to the terminal, fewer delivery trucks will depart with partial loads. Consequently, the trucking company would be able to move the same amount of freight at a lower cost.

DESCRIPTION OF THE PREFERRED EMBODIMENTS

Figure 1A:
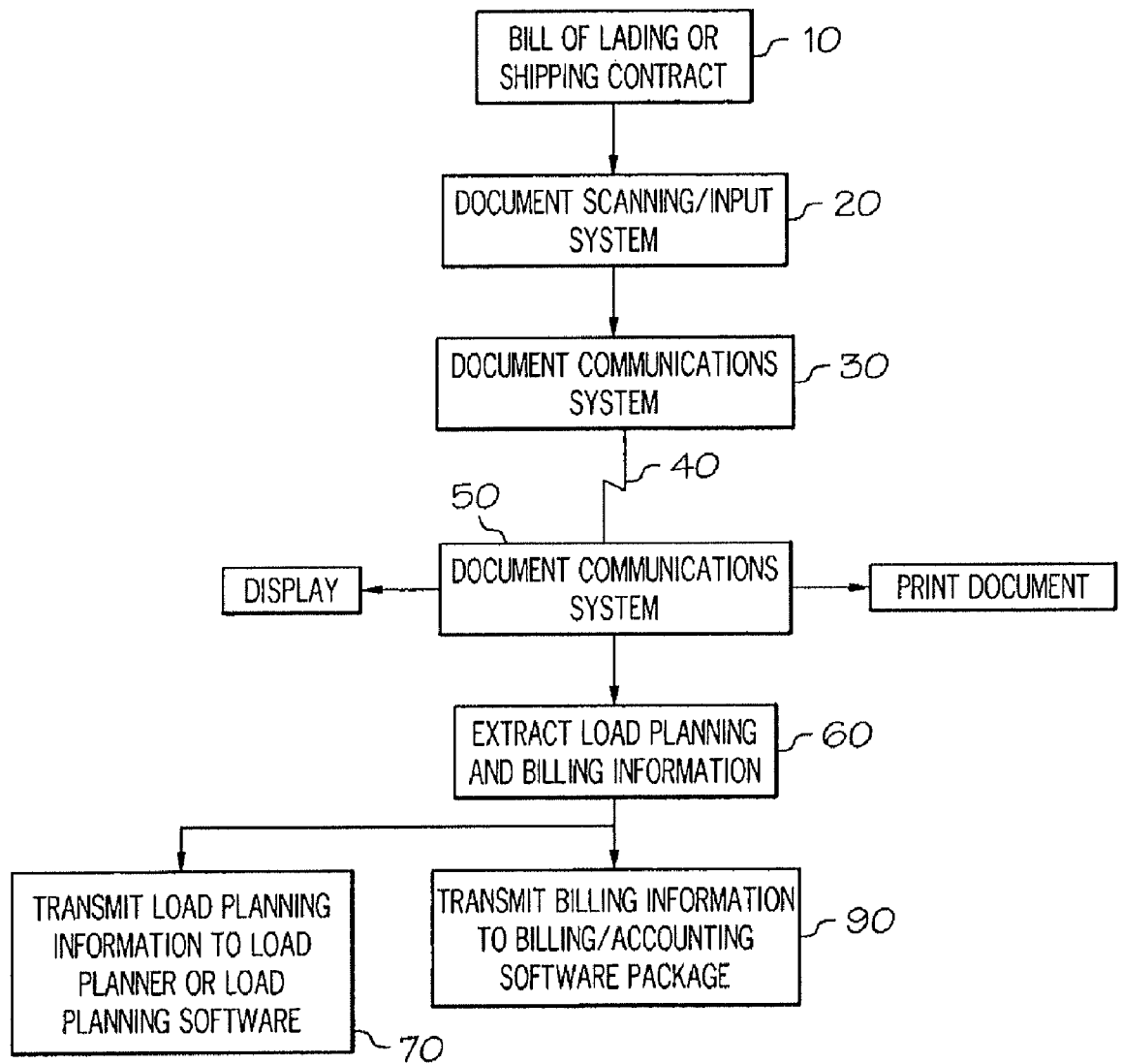
FIG. 1A is a block diagram of a load planning and billing system setup in accordance with the present invention.

FIG. 1A illustrates a bill of lading transmission and processing system for less-than-a-load (LTL) carriers in accordance with the present invention. The bill of lading transmitting and processing system 10 comprises scanning a document using a scanning/input system 20, initiating a document transmission using a communication system (transmitter) 30, establishing a connection using a communications link 40, receiving a document using a communications system (receiver) 50, extracting the load planning and billing information 60 from a transmitted electronic bill of lading, transmitting or sharing the load planning information with a load planner or load planning software 70, and transmitting or sharing the billing information extracted from the electronic bill of lading with a billing or accounting software package 90. The illustrated system is designed so that a truck driver, while en route, can transmit a bill of lading received from a customer to a central processing location where the billing and load planning information is extracted and used.

Figure 1B:
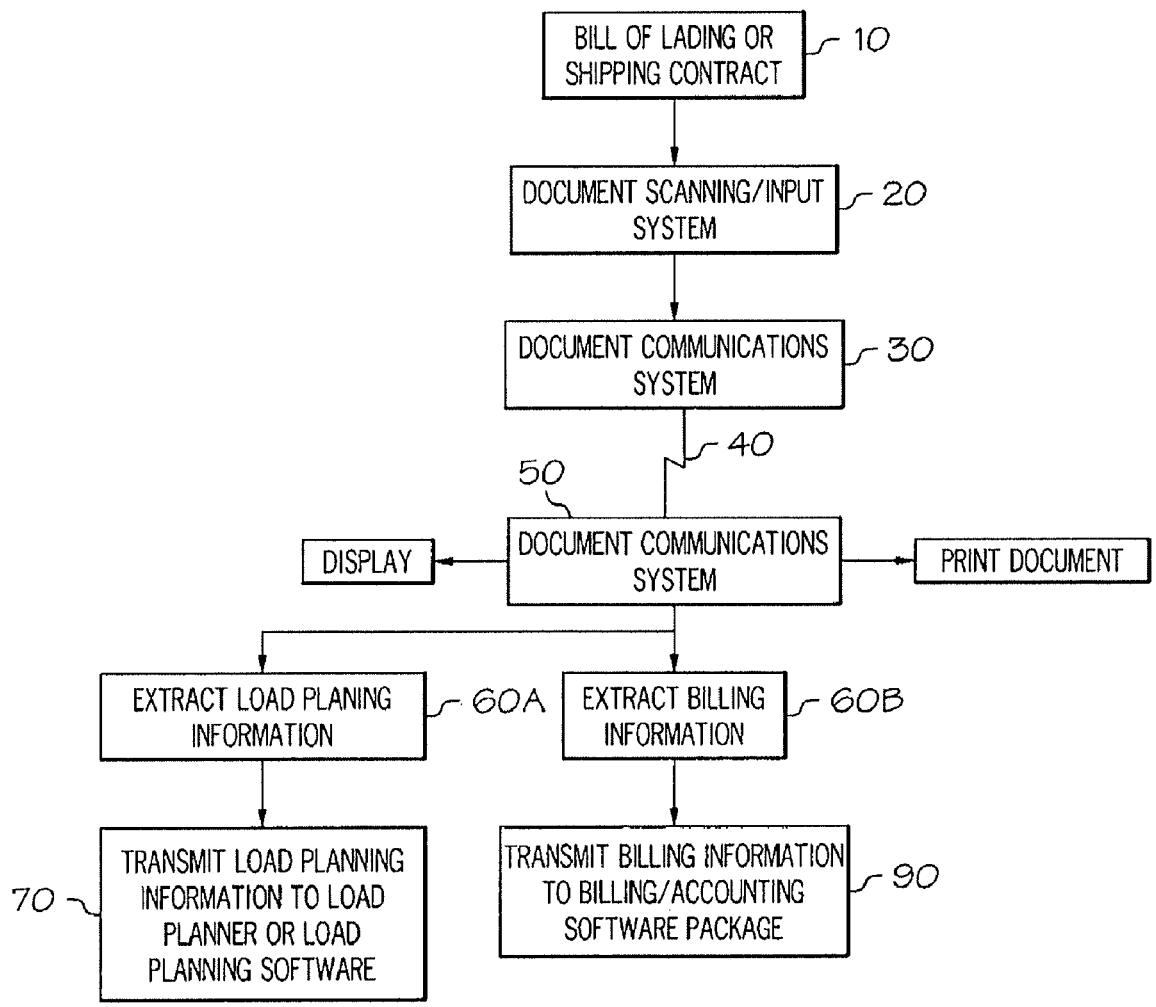
FIG. 1B is a block diagram of an alternate embodiment of a system for load planning and billing similar to that shown in FIG. 1A.

FIG. 1B shows an alternative version of the system described above. The only difference is that the extraction of load planning and billing information is split into two blocks. The extraction of load planning data 60A and the extraction of billing information 60B. This information is used as described above.

The document scanning/input system 20 can take many different forms. One exemplary method and system comprises a portable scanner connected to a notebook computer. This computer is capable of being interfaced with the communication system (transmitter) 30 selected by the user. Alternatively, a portable fax machine capable of being either directly or through an interface circuit connected to a variety of communications systems including but not limited to cellular telephones, radio links, satellite communication systems and standard telephone systems. If a scanner connected to a personal computer system is used, the computer can include the appropriate software as well as the appropriate PCIMA card or a built in interface for connection to any of the above communication systems (transmitter) 30. As an alternative to using a full notebook computer, a personal digital assistant (PDA) may be utilized if it has the appropriate interface capability between the scanner and the communication system 30 selected. Additionally, if customers agree to use a standard electronic form for a bill of lading or other shipping document, the form could be given to the driver on disk and then transmitted directly without the need for scanning. Furthermore, a PDA or personal computer could be programmed with an electronic form that the customer could fill out and sign while the driver was loading the shipment. After review and verification by the driver, the PDA or computer would then transmit the electronic form to the communication system. Thus, it can be readily seen that the document scanning/input system can be produced as a single unit or may be made up of several independent systems connected together.

The document communication system (transmitter) 30 and document communication system (receiver) 50 are comprised of similar equipment, such that both a transmitting device and a sending device will include a compatible software to interface with one another through transmission protocols such as TCP/IP, or any other transmission protocols. This communications equipment can be a stand alone system or can be provided as part of an integrated package with the document scanning or input system 20. The preferred packaging would be to use separate systems so that the communication systems could be upgraded or changed as technology and the trucking company requirements change. Examples of communication systems that could easily be used to transmit a signal which contains the information from the bill of lading are the following broad categories: analogue telephones; digital telephones; high frequency (HF), very high frequency (VHF), or ultra-high frequency (UHF) radio transmitters; cellular telephone; or satellite communication systems. The distance over which the communications link 40 must be reliable will determine which communication system is selected by a specific user. For short distances (line of sight), cellular telephone and VHF/UHF radio links can be utilized. Medium distance transmission (line of sight to 100 miles) would typically use cellular telephones if available or HF radio links. HF radio is the least preferred communication system due to signal propagation problems. Long distance communications could use cellular telephone if available or satellite communication systems.

The use of standard or plain old telephone systems (POTS) communication circuits could be accessed using an acoustic coupler and a modem so that a standard telephone handset could be utilized. If it is not necessary to utilize a standard telephone handset, then just a modem with a direct connection to the telephone system would be utilized. To utilize any of the HF, VHF or UHF radio systems, a radio frequency modem would be required to be a part of the communication or communication system 50. To use cellular technology in either an analogue cellular phone or a digital cellular phone, the appropriate cabling and modems would also be required to be part of the communication systems 30 or 50.

There is a fairly broad spectrum of satellite communication systems presently available and a host of satellite communication systems that are being developed or implemented that could be utilized in the future. All of these systems will require the use of some type of radio transceiver and antenna assembly for communicating between the satellite and the truck. Depending upon the type of satellite communication equipment utilized, a radio frequency (RF) modem or some other interface may be required to be a part of the communication systems 30, 50 in order for the digital information generated by the document scanning/input system 20 to be converted into a radio signal for transmission to the satellite. Additionally, some trucks already use a satellite communication system to track the vehicle's location and communicate with the driver. If such a system is already installed the document scanning/input system 20 could interfere directly with the installed equipment.

Communication link 40 can comprise any system or method of transmitting the information from the communication system 30 to communication system receiver 50. These systems and methods include: 1) standard phones lines; 2) a combination of radio and telephone circuits, as used in a cellular telephone system; 3) a direct radio circuit, which would be employed in a situation using an HF, VHF or UHF radio link; 4) a combination of VHF or UHF radio link to a satellite with a return VHF, UHF link to a ground station, the ground station would link to a central processing facility over a telephone line, alternatively the ground station and telephone line could be replaced by a second radio link directly to the central processing facility, depending on how the satellite communication system was designed to be used.

In order to maximize the efficiency of the bill of lading transmission and processing system, the electronic bill of lading, received at the central processing facility for the trucking company is processed to extract the load planning and billing information 60. Alternatively, the load planning information 60A and billing information 60B may be separately extracted. To extract this information, the electronic bill of lading received by the document communication system 50 would be processed to remove the applicable information from the electronic bill of lading and transmit the required information to either the load planner 70 or to the billing and accounting software package 90.

One method of extracting load planning and billing information would be to interface the document communication system 50 with a standard personal computer using the appropriate modem or interface box. The electronic bill of lading would be digitized and then processed with an optical character recognition (OCR) or intelligent character recognition (ICR) software package. The character based electronic bill of lading provided by the OCR program is then used in the load planning and billing processes. The load planning information would preferably then be transmitted to the load planner over a local area network. This information could be printed and/or displayed at the load planner's terminal. As an additional time saver the load planning information 60 could be transmitted to a computer running on the local area network. This computer would run a load planning software package which would do the load consolidation and planning automatically.

A second method of extracting the load planning and billing information would be for a data entry clerk to view either a paper or electronic copy of the electronic bill of lading and manually enter the appropriate data into a computer system for load planning, billing, and accounting. If a computerized load planning system was not utilized, a paper copy of the electronic bill of lading would be printed and given to the load planner.

The billing information extracted would be transmitted or inputted into a standard billing and accounting software package which could automatically invoice the shipper so that there would be a shorter time period between picking up a load and billing the shipper. Additionally, the load planning information extracted could be transmitted or input into a load planning software package that could automatically build a shipping and loading plan to minimize partial loads and keep the shipments on time. An additional value of having the load planning and billing information automatically extracted from the electronic bill of lading is expected that fewer errors in load planning and billing would be made. In practice, this system can range from a fully automatic, electronic, paper less system to one which relies on paper and uses the system merely as a transmission device.

Figure 2A:
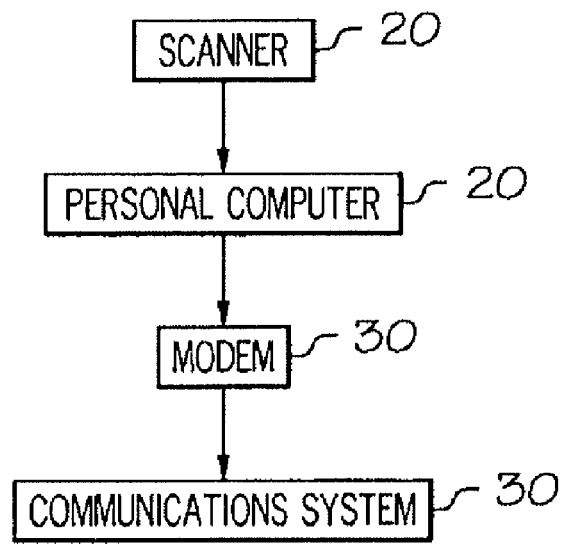
FIG. 2A is a functional block diagram of document scanning and transmission device using a personal computer setup in accordance with the present invention.
Figure 2B:
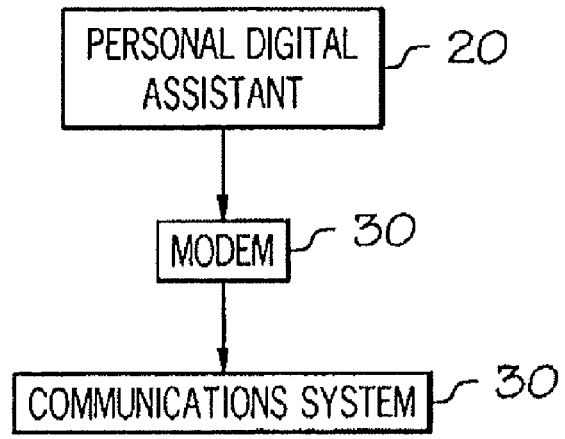
FIG. 2B is a functional block diagram of an electronic bill of lading transmission system setup in accordance with the present invention.

FIG. 2A is a functional block diagram of a document scanning transmission device 20 using a personal computer and a scanner. Furthermore, a document communications system 30 includes a modem for transmission. Alternatively, a document scanning transmission device 20 could be created by utilizing a PDA as shown in FIG. 2B.

Figure 3:
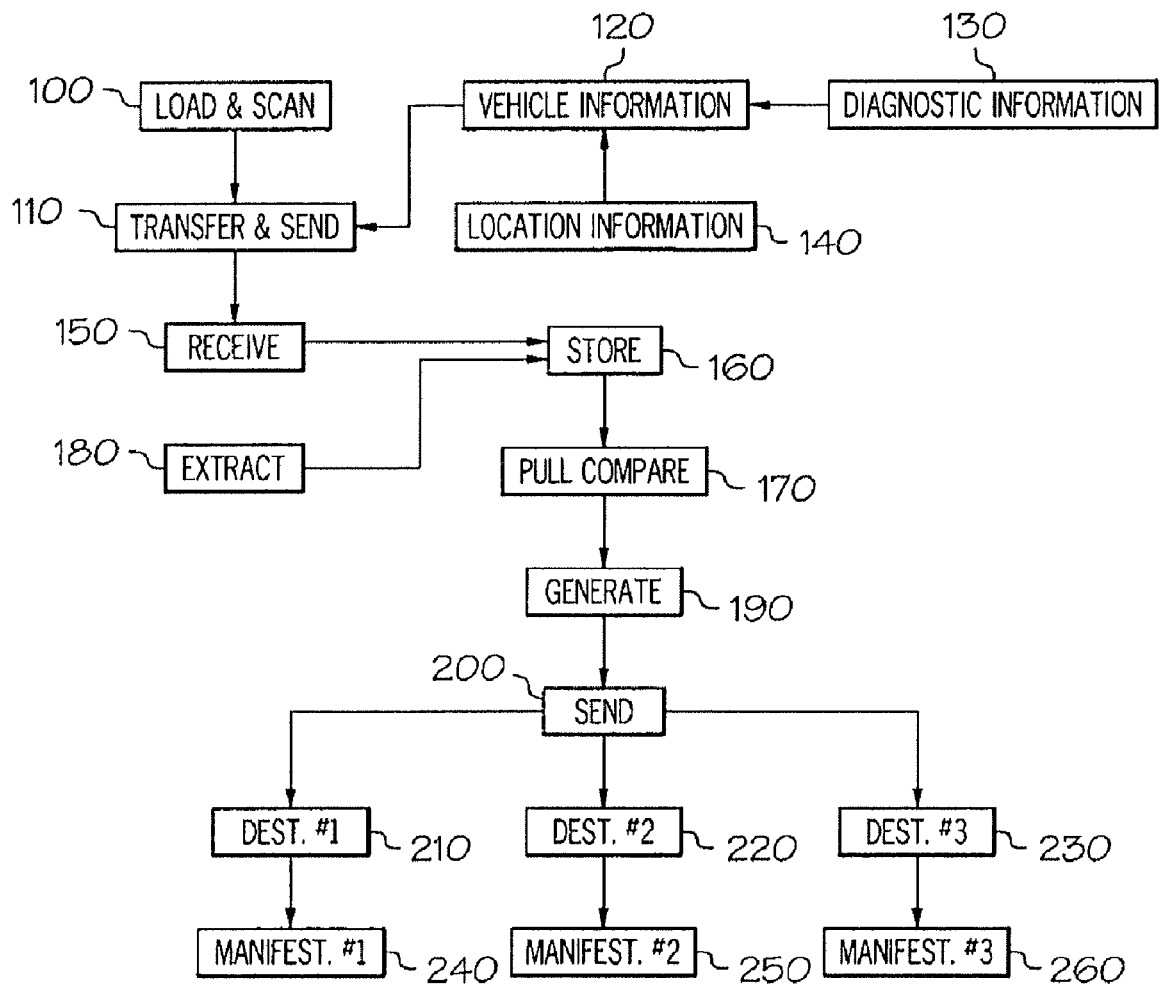
FIG. 3 is a flow diagram depicting an illustrative method of transmitting shipping documentation in accordance with the present invention.

FIG. 3 is a flow diagram depicting a method of transmitting shipping documentation enabling dynamic load planning in accordance with the present invention. Shipping documentation is often received in paper form by the driver of a truck from a customer at the time of pickup or otherwise while the driver is delivering his/her cargo. The documentation is generally associated with a package or item to be delivered given to the driver by a customer (or completed by the driver at the time of pickup). This documentation may be supplemented by the driver with remarks, weather conditions, corrections, additional details, and otherwise updated en route as applicable. Typically, such shipping documentation includes bills of lading, and the documentation may be one to several pages in length for each package or item to be separately delivered. The term "package" will be used herein to connote any item or cargo to be shipped. The driver may have a number of unique bar coded self adhesive stickers with each unique bar code being replicated on two identical stickers. The driver will place one of these stickers on the package or item provided by the customer and another corresponding sticker will be placed in the upper-right-hand corner of the first page of the shipping documentation. These bar codes can be encoded in a machine readable format and are marked in a structured manner such that a bar code reader equipped with compatible software can readily identify information from the bar code, such as, the identification of the truck driver receiving the package, date of receipt, general location of receipt, identification of the truck, route information, or the like.

Having identified the package and the documentation, the driver loads the package onto his truck in step 100 and scans an image of the documentation received creating an electronic representation of the documentation. This digital representation of the documentation is then transferred to an image processor where the image is prepared for transmission in step 110. Many commercially available scanning devices are capable of creating an image of the documentation and capable of interfacing to a computing device such as a palm-top computer. In this exemplary embodiment, the palm-top computer includes an image processor which includes software logic capable of compressing the image into a smaller memory space. Compression techniques are well known in the art and any appropriate compression technique would be sufficient. The image processor also interfaces with a transmission device such as a cellular modem, wireless modem, and the like.

Prior to sending the compressed documentation, the software logic break the documentation into smaller units, or packets. These packets will generally be numbered and the total number of packets recorded as part of the processing. This will permit the computing device used by the driver, to reliably transmit to a remote processing center's computing device. Busting the documentation into smaller packets, which are then sent in Step 110, will also decrease the expense associated with transmitting the documentation should an error in transmission occur, such as loss of communication with a cell tower after 50% of the documentation was sent. Particularly, if an error is encountered, both the computing device used by the driver and the remote processing's computing device will know what packets have been received and what still needs to be received by the remote processor. Initially, the transmission device of the driver's computing device makes contact with the remote processing center's computing device and transmits the total number of packets which are to be sent. As each packet is received, the packet's number is recorded by both the receiving computing device and the sending computing device. With this information, error recovery with failed transmissions can be readily resolved.

Once the documentation is successfully received (step 150) at the selected remote processing site, the packets are ordered correctly and concatenated together to reform the document (or documents) sent, which is then decompressed. The decompressed documentation is stored on the remote processing center's computing device in step 160.

Thereafter, load plans for a destination, which may include interim and final destinations for a package, can be dynamically preformatted and manipulated by using a computing device to request from the remote processing center's computing device an advance loading manifest. Advance loading manifests, are documents generated by the load planning software discussed above. These documents provide instructions to workers at a destination, informing the workers that a particular package or item needs to be placed on a particular truck for further shipment at a particular time. Since, the load planning software is receiving documentation regarding the packages dynamically throughout delivery day, whenever the load planning software is requested to generate an advance loading manifest, the loading efficiency of the trucks is fully maximized, at that point in time. As will be understood, the inventive system enables dynamic routing of items and packages as they are en route. Optimization of transportation resources and delivery times can thereby be accomplished on a dynamic and real time basis, and shipments can be redirected to accommodate changing conditions and needs of customers, vehicles and extraneous factors (e.g., weather and traffic).

When an advance loading manifest is requested, the remote processing center's computing device, utilizing a software logic, will programmatically request an extract (step 180) of all documentation relevant to generating an advance loading manifest for a requesting destination. These sets of documentation are pulled from the computing device's storage in step 170 and compared. In step 190, the relevant information contained in these sets of documentation such as package weight, package dimension, package destination, package delivery requirements, package current location, etc. are fed to the load planning software to produce one or more advance loading manifests.

The generated advance loading manifest is then transmitted by the remote processing center's computing device to the requesting destination (e.g., steps 210, 220, and 230). While it is contemplated that a single remote processing center for at least selected geographic regions, it should be understood that the processing center could also be located at a destination or interim destination, and that any number of processing centers might be utilized to service any particular geographic region. Reception of the advance loading manifest at the requesting destination may be by any acceptable electronic means such as facsimile, hand held computing devices, email, electronic bulletin boards, or direct transmission to the requesting destination's computing devices such as on a network. The requesting destinations may then view and use the generated advance loading manifests (or alternatively access the data to generate their own manifests) to optimize truck loading in steps 240, 250, and 260.

Figure 4:
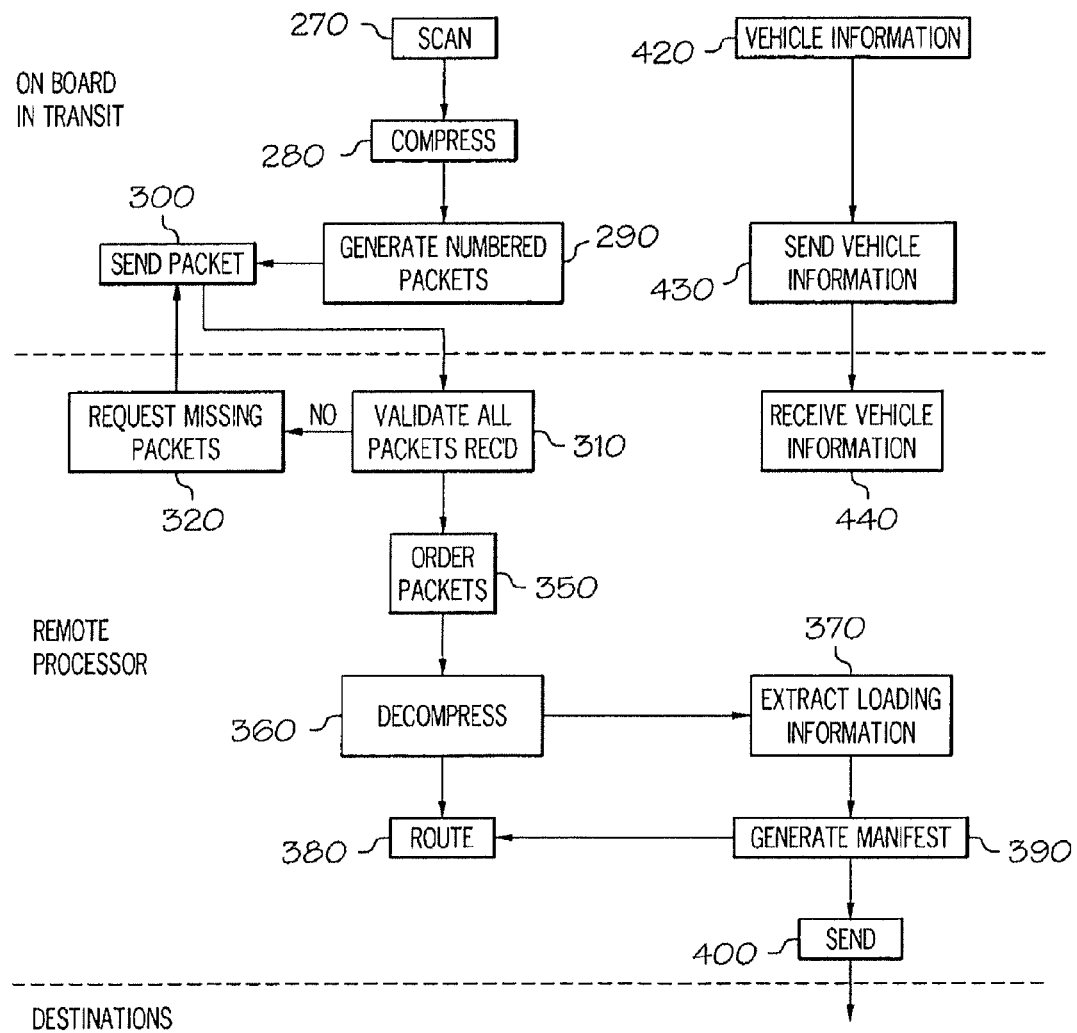
FIG. 4 is a flow diagram depicting an illustrative method of processing an image in accordance with the present invention.

FIG. 4 is a flow diagram depicting an exemplary method of processing an image in accordance herewith. This image might be shipping data in the form of documentation provided by a customer to a driver and associated with a customer's package. It may also include comments, remarks, details, error notations, and corrections which are electronically communicated by the driver and associated with the image. The driver may add this additional data to be associated with the image, through any electronic input device interfaced to a computing device or by writing the additional data on the customer's documentation. This may be accomplished by following instructions (generated from a software program developed to obtain standard comments from the driver) on a computer screen and selecting options with an attached mouse; using a keyboard to type additional data; using a wand to write in the information on a PDA; using a pen to make notations on the documentation which will then be scanned in with the documentation; speaking into an input device interfaced to a computing device and capable of performing voice recognition operations; and transferring the additional data from one computing device to another such as using infrared transmission from a driver's PDA to the driver's main computing device.

Once the customer documentation and package are received at a pickup point, the items are labeled with bar coded stickers as discussed above with FIG. 3. Next, the driver may add additional information to the documentation itself or through the driver's computing device. The documentation is then scanned into the driver's computing device in step 270. An electronic image is created of the documentation which includes any driver added information. This image is then compressed in step 280, and preferably divided into smaller units or packets in step 290. Each packet is then sent in step 300, and if a remote processor indicates a packet was not received properly in step 320, the packet in question is resent in step 300 until successful completion.

Simultaneously, the driver's main computing device is preferably capable of recording or receiving information about the transportation vehicle in step 420. This information might include, mechanical performance of the vehicle (e.g., engine temperature, oil pressure, fluid levels, tire pressure, and the like), location of the vehicle, weather conditions, speed of travel, direction of travel, and the like. This vehicle information is sent to the remote processor in step 430.

Steps 270, 280, 290, 300, 420, and 430 can all occur while the driver is on board the transportation vehicle or while the truck is in transit. While the scanning step (270) may be undertaken prior to departing a pickup location (e.g., where there is only a single driver), this step might be performed while en route by using an automatic feed/scanning arrangement, or where another person on board can complete the scans en route. The phrase "on board" is intended to connote the fact that the equipment will travel with the driver and vehicle, and is not limited to any particular location. Therefore, the driver could transmit customer documentation or vehicle information from a PDA or device that can be carried with him outside of the truck cab, or could use the equipment to scan and transmit from physically being in the vehicle itself. Moreover, sending the customer documentation and vehicle information can occur while the driver is actually driving the transportation vehicle, as mentioned. Once all information is stored electronically, preferably no further actions are required by the driver to ensure the information is sent to the remote processor, since this can all be coordinated with executable instructions residing on the driver's computing device and the remote processor's computing device. This frees the driver to continue with his deliveries with minimal interruption and delay, and requires very minimal training of the driver.

The remote processor initially validates that all packets are received in step 310. If packets are not fully received, the sending transportation vehicle to will resend a missing packet in step 320. Once all packets are received, they are assembled in the appropriate order in step 350 and decompressed in step 360. Based on the bar coded label associated with the documentation, the documentation may be routed to different work processing queues. Work processing queues are electronic locations where certain operations are to be performed based upon the receipt of the documentation. For example, the loading information contained in the documentation may be electronically transmitted to another remote location so that the image of the documentation may be manually keyed into an electronic text format for use in load planning software discussed above. Moreover, billing information may be manually keyed into a software billing system.

The work processing queues need not be local to the processor sending the documentation. In this way, the documentation may be routed to work processing queues any where in the world, where for instance labor is less expensive and more abundant. For example, the documentation may be routed to India, China, Indonesia, or the Philippines so that the documentation can be manually keyed at a lower cost. Furthermore, this routing to different time zones permits documentation to be processed 24 hours a day, since many of the recited countries above are working while much of the United States sleeps.

Alternatively, image data which is well fielded or structured may have the loading data programmatically extracted out of the image in step 370 and then inputted to a load planning software for generation of an advance loading manifest in step 390. Finally, in step 400 the generated advanced loading manifest can be directed to remote destinations upon request.

Moreover, as one skilled in the art will appreciate the load planning software need not reside exclusively on the remote processor, this software may reside on the computing device or devices of the remote facilities themselves. In these situations, the documentation may initially route through the remote processor but, the processing of the documentation and the generation of the advance loading manifest could occur at the requesting remote facility. Furthermore, if a particular set of documentation is rerouted to a new facility, it may be recalled from the remote facility's computing device by the remote processor and routed to the new facility appropriately. In this way, the remote facility provides a central dynamic routing of the documentation yet, the processing of the documentation occurs when and where it is needed.

Figure 5:
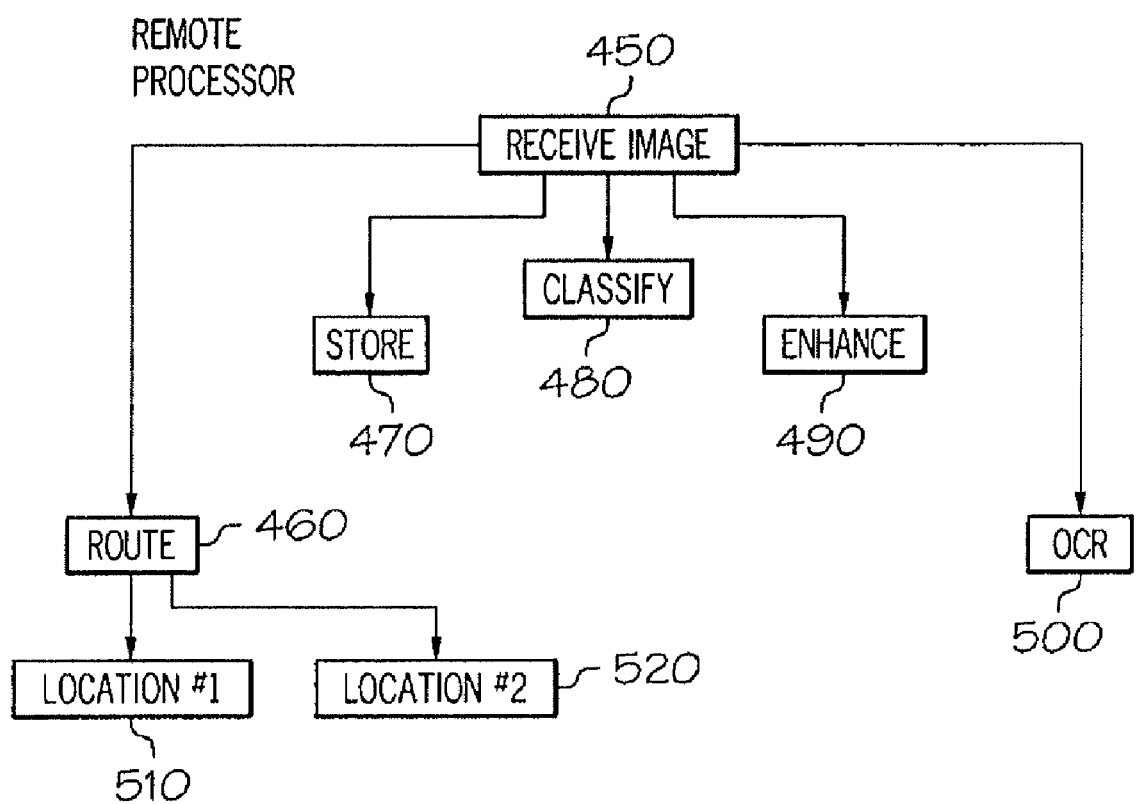
FIG. 5 is a diagram illustrating image processing by a remote processor in accordance with the present invention.

FIG. 5 is a diagram illustrating image processing by a remote processor such as a central processing system. In step 450 an image is received by the remote processor and based on its bar code routed in step 460 to multiple work queue locations 510 and 520. The image is also sorted for storage when received on the remote processor in step 470. The image is classified in step 480. Classification of the image is preferred so that the image received can be associated with other images which are relevant to a particular destination or a particular searchable characteristic (e.g. type of item, model of product, and the like). For example, if transportation vehicles 1 and 2 each receive documentation pertaining to packages received while the drivers are performing deliveries, and both vehicle 1 and vehicle 2 are arriving at a loading/unloading destination, the images from each of these transportation vehicles would be associated together by a classification means. In a common scenario, this classification means might use the bar code on the images to identify the trucks sending the images and then to store the images in a directory associated with the destination of these two transportation vehicles. The items or packages might also be classified as to the type of product, color, model number, etc., so that an individual item could be identified and (for example) redirected to an alternate destination while en route. Once the loading information from these images are appropriately extracted or manually keyed from these images, the information is passed to a load planning software package for generation of an advance loading manifest.

Moreover, a received image (e.g. as in FIG. 5) may be programmatically enhanced by commercially available software, such as InputAccel, to provide for better image quality or resolution by performing operations such as despeckling, cropping, and improving image brightness. Improved image quality will permit more accurate automatic processing and/or manual keying of the information included on the image. Furthermore, the image may have an OCR process (step 500) performed on it permitting automatic generation of electronic text associated with the image. This electronic text could then be programmatically inputted to a load planning software for generating advance loading manifests.

InputAccel also performs work flow processing of the image by monitoring directories contained on the computing device and identifying images when the images become available in the directories. For example, types of images can be identified by the image file name extension and automatic operations can be performed on the images based on the directory in which they appear and their file names. In this way, the images are programmatically processed upon receipt by the remote processor and the load planning information associated therewith is dynamically available when an advance loading manifest is requested. This automation reduces the amount of personnel required to process loading documentation, reduces errors associated with manual processing, and substantially increases the efficiency of generating advance loading manifest.

Figure 6:
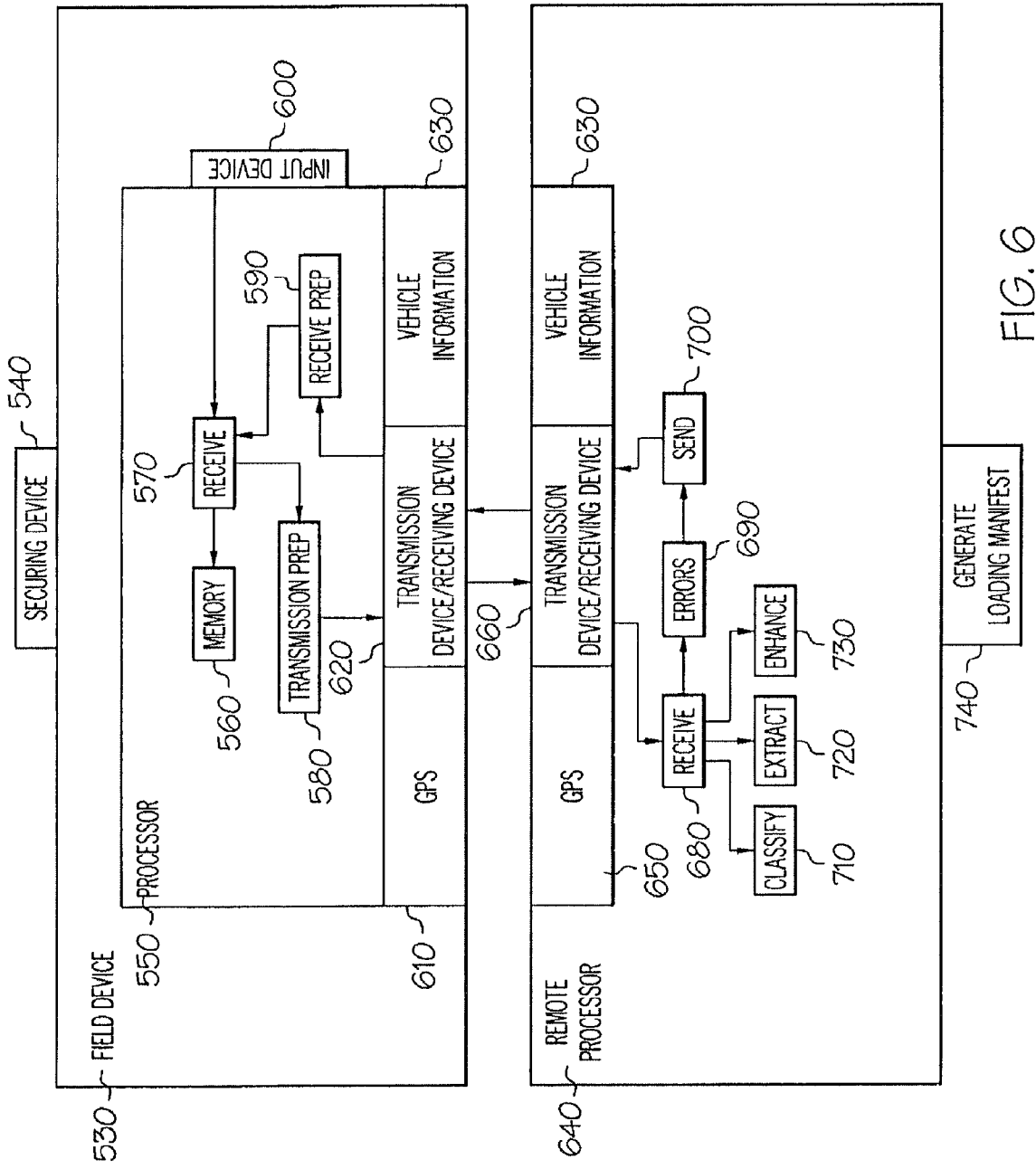
FIG. 6 is a block diagram of an illustrative device capable of scanning and transmitting an image to a remote processor in accordance with the present invention.

FIG. 6 illustrates a schematic example of a device capable of scanning and transmitting an image to a remote processor in accordance with the present invention. Although FIG. 6 depicts a diagram as a single device, as one skilled in the art will appreciate, this arrangement need not be a single device but could be several devices which interface together to form a logical device depicted in FIG. 6. FIG. 6 depicts a field device 530 referred to as a mobile data transmission device ("MDT"). The MDT 530 has a processor 550 which includes a memory 560 and set of executable instructions residing on the processor 560 capable of receiving transportation documentation in 570 from an input device 600 which is interfaced to the processor 550. This input device 600 might preferably include a scanner which electronically converts transportation documentation into an electronic image. However, if the transportation document is already in image form and contained on a separate device such as a PDA, the input device could be an infrared transmission port which is capable of receiving the image from a device such as a PDA. After receipt of the image, the image is stored in the memory 560 and prepared for transmission in 580. Preparation for transmission includes establishing a communication with the transmission/receiving device 620, and, preferably, compressing the image. The transmission device 620 will then electronically send the image to a remote processor 640 by establishing a connection with the remote processor's 640 transmission/reception device 660.

Furthermore, the MDT 530 may include a global positioning satellite ("GPS") device 610 interfaced to the processor 550 for relaying location information to the remote processor's 640 GPS 650. Moreover, vehicle information 630 associated with the MDT 530 is communicated to the processor 550 and transmitted to the remote processor 640. Vehicle information can include any of a variety of performance, diagnostic, and status information as discussed above with FIG. 3 and is useful in creating better real time communication and planning of shipping manifests and loading and delivery schedules. The GPS will provide location information of the transportation vehicle (and the items and packages) and directions to the driver of the transportation vehicle. Additionally, the MDT 530 may contain a Radio Frequency Identification (RFID) tag, such that the MDT 530 can be continuously located with wireless transmission.

The MDT 530 may be built into the transportation vehicle itself, or it may be a separate device which can be removed from the transportation vehicle with or separate from the balance of the processing system. FIG. 6 depicts a securing device 540 which permit a removable MDT 530 to be attached to the transportation vehicle during transit, this may include an electronic connection similar to laptop computer docking stations, and would permit the MDT 530 to receive power. Power to the MDT may be supplied through a battery source, and can be connected to the transportation vehicle's battery utilizing the securing device 540.

The MDT's 530 transmission/receiving device 620 establishes a communication with a remote processor's 640 transmission/receiving device 660. Once this communication is established, the MDT 530 may transmit transportation documentation, vehicle information, and/or location information. Moreover, the MDT 530 may receive information from the remote processor 640, such as requests to resend parts of the transportation documentation not successfully received by the remote processor 640, or for location updates and/or other vehicle information. Further, the remote processor may send electronic instructions to the driver via the MDT 530 utilizing the MDT's 530 GPS 610. Information received by the MDT 530 is processed in 590 by the MDT's 530 processor 550. Once received information is in a format understandable to the processor 550, it is available for use by the processor 550 and may be communicated to the driver if necessary, through a user display screen, paper print out, or by audio device. For example, additional pickups or rerouting instructions for one or more items to be delivered might be sent to allow redirecting of one or more items en route.

Transportation documentation sent by the MDT 530 is preferably received by the remote processor 640. A set of executable instructions residing on the remote processor 640 initially receives the transportation documentation in 680. If errors 690 are detected, a send 700 request is initiated causing an instruction to be sent from the remote processor's 640 transmission/receiving device 660 to the MDT's 530 transmission/receiving device 620. This instruction informs the MDT of the exact parts of the transportation document which need to be resent. Preferably, no driver intervention or action is required to effectuate the resending of the transportation documentation.

Once the remote processor 640 successfully receives a set of transportation documents, it may be electronically routed to perform a variety of operations such as classification 710, extracting 720 (loading or billing information), and enhancements 730 (e.g., improving image quality by varying brightness), and, of course, load planning and shipping manifests.

Whenever a request is made of the remote processor 640 for an advance loading manifest, the request will route to load planning software where an advance loading manifest 740 is produced for further electronic transmission or hard-copy output.

Figure 7:
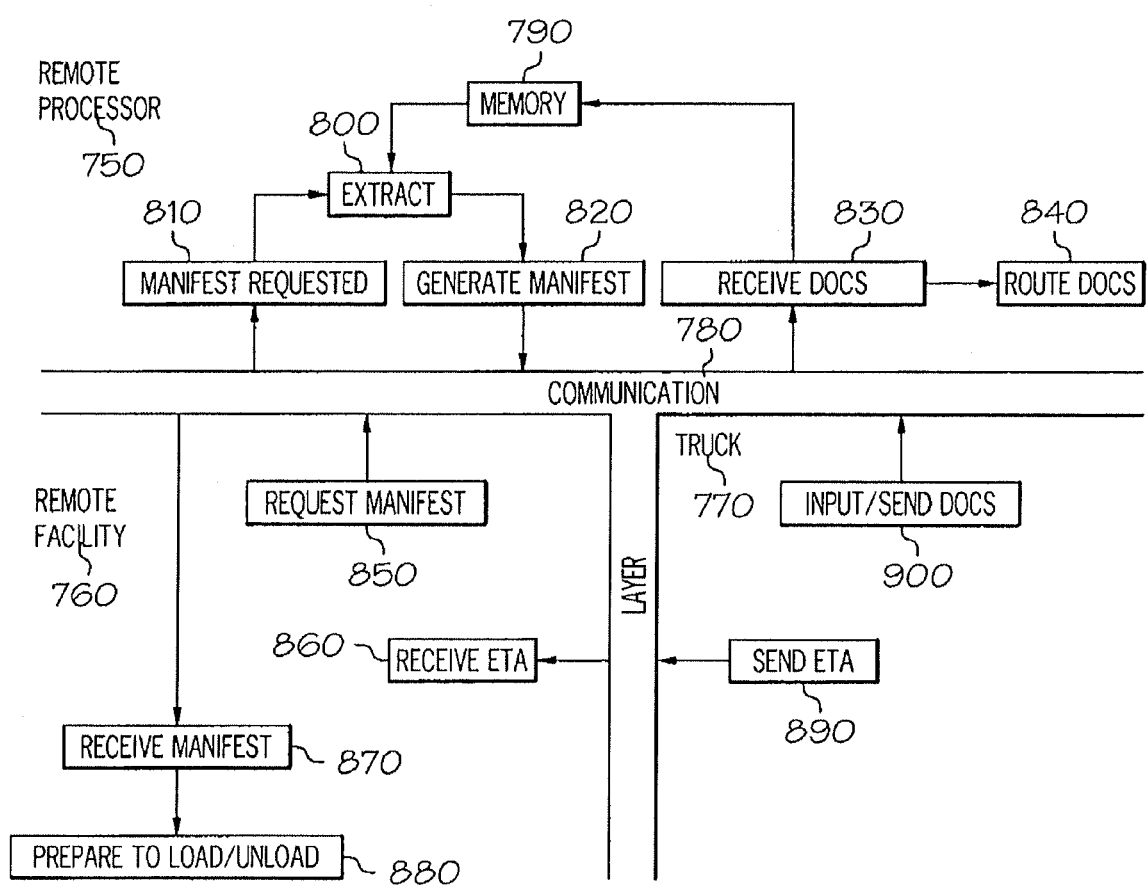
FIG. 7 is a block diagram of an illustrative remote processor which dynamically generates advance loading manifests in accordance with the present invention.

FIG. 7 is a schematic illustration of an exemplary remote processor 750 for dynamically generating advance loading manifests. FIG. 7 also depicts the overall process of the present invention. The remote processor 750 includes a set of executable instructions permitting it to interface with one or more remote facilities' (e.g. 760) computing device and a truck's (e.g. truck 770) computing device through a software communication layer 780. This software communication layer 780 might preferably include standard protocols available in the art which permit computing devices to interface with one another such as TCP/IP.

Initially, transportation documents are sent from the truck 770 (e.g. as shown at block 900) via communication layer 780. The remote processor 750 receives the documents in 830 and proceeds to route the documents in block 840 and store them to the memory of the processor in block 790. Routing the documents in this way can permit additional operations to occur on the documents such as manual keying, OCR, classification, and image enhancements. As previously discussed, commercially available software such as InputAccel provides this automated routing and operation execution on the received documentation. Moreover, as one skilled in the art will appreciate, information regarding the contents of the document could also be stored in a database and the contents of that database made available to the remote facilities and trucks on demand.

Throughout the actual pickup/delivery travel of the truck 770, an estimated time of arrival ("ETA") can be communicated from the truck 770 to the remote facility 760 via the communication layer 780. The remote facility 760 receives the ETA in 860 and makes a determination at some point to request a loading manifest 850 from the remote processor 750 via the communication layer 780. Alternatively, such ETA can be determined by the remote processor as a result of updated vehicle information received from the truck 770. The remote processor receives this request of the remote facility 760 in block 810 and causes an extraction of all the relevant load planning documents from the remote processor's 750 memory 790 in block 800. This extracted load planning data is fed to a load planning software causing an advance loading manifest to be generated in block 820. Once the advance loading manifest is generated, it is sent to the requesting remote facility 760 in block 870 via the communication layer and used in 880 to load and unload (as appropriate) the arriving truck 770.

Figure 8:
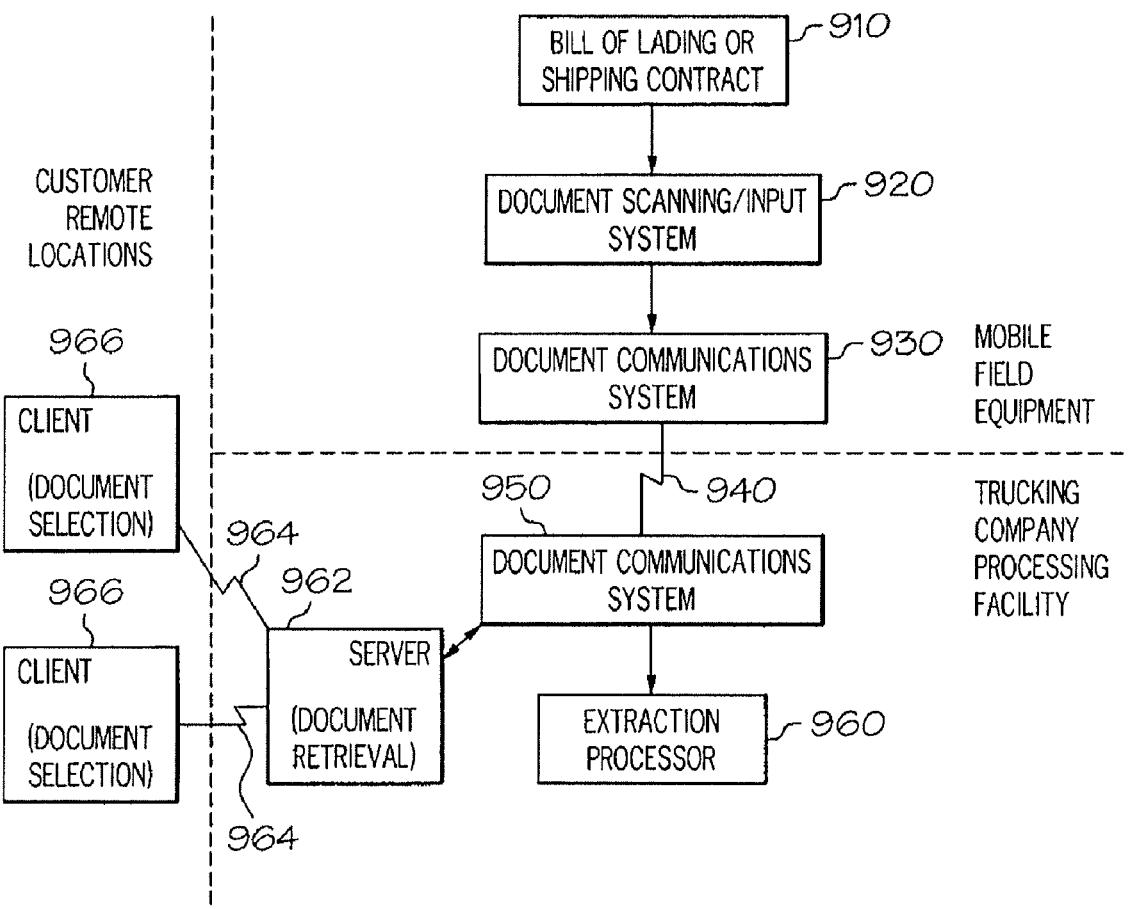
FIG. 8 is a block diagram of an alternate embodiment of a system for load planning and billing.

FIG. 8 is a block diagram of an alternate embodiment of a system for load planning and billing, similar to that shown in FIG. 1A. In particular, a document scanning/input system 920, such as one that includes a portable scanner for example, is interfaced with the transmitter 930, which provides the document to the receiver 950 via the communication link 940.

The electronic bill of lading, received at the central processing facility for the trucking company by using the receiver 950, can be processed to extract the load planning and billing information, to transmit the appropriate information to the load planner, and/or to the billing and accounting software package. In particular, an extraction processor 960 can be provided to extract this information from the electronic bill of lading. As discussed above, one method of extracting load planning and billing information would be to interface the document communication system 950 with an extraction processor in the form of a standard personal computer using the appropriate modem or interface. The electronic bill of lading could be digitized and then processed with an optical character recognition (OCR) or intelligent character recognition (ICR) software package. The character based electronic bill of lading provided by the OCR program can then used in the load planning and billing processes. A second method of extracting the load planning and billing information would be for a data entry clerk to view either a paper or electronic copy of the electronic bill of lading and manually enter the appropriate data into a computer system for load planning, billing, and accounting. If a computerized load planning system was not utilized, a paper copy of the electronic bill of lading would be printed and given to the load planner. The billing information extracted would then be transmitted or inputted into a standard billing and accounting software package which could automatically invoice the shipper so that there would be a shorter time period between picking up a load and billing the shipper. Additionally, the load planning information extracted could be transmitted or input into a load planning software package that could automatically build a shipping and loading plan to minimize partial loads and keep the shipments on time.

In addition, the illustrative system of FIG. 8 also allows the document received by the communication system 950 to be remotely accessed by customers or other users of the system. For instance, the shipping customer, whose package has been provided to the driver, can access the system remotely to view the bill of lading and any other related shipping documentation and information. In particular, in the illustrative embodiment of FIG. 8, once the documents have been received by the communications system 950, which can be minutes after the driver has transmitted them, they can be available to a server device 962. The server 962 can comprise any suitable hosting computer or device, such as one that hosts a website or webpage, or one that otherwise allows access to data or documents from a remote location. Remotely connected to the server 962 via a wired or wireless communication link or channel 964 are one or more client devices 966 for accessing the shipping documentation that has been received from the driver. These clients 966 can comprise any suitable computing or electronic devices capable of accessing the server 962 or otherwise retrieving data from the server 962. For example, standard computers, handheld devices, portable devices, and the like may be utilized.

The Internet may be utilized as the communication link 964, if desired, for allowing access by customers to the shipping documents. As an example, the server 962 could comprise a web server that allows for retrieval of the shipping documents that have been remotely transmitted from the driver, and that allows for posting or otherwise providing these shipping documents via a webpage or website. The client devices 966 could comprise computers or handheld devices that include web browser hardware and software that can communicate with the server 962 for accessing the shipping documents. For instance, when the customer connects to the server 962 via the internet using the client device 966, a web browser running on the client device 966 could ask the customer to type in the keyword for the desired document and click on the appropriate button. The web site software on the server 962 could then receive the request and connect to an Imaging database where the shipping documents are stored. The server software could then perform a query for that document keyword. Once the document is found, it can then be copied to the web server 962 and converted to JPEG, or another suitable format, and displayed to the user via the web connection 964 and the web browser software on the client 966. The software running on the client 966 may allow the user to zoom in or out, rotate, save a document, or view another document.

As one skilled in the art will appreciate, the ability to bi-directionally and dynamically communicate with transportation vehicles and to remotely process transportation documentation, tremendously optimizes the performance of the transportation business, as well as allowing more freedom and control in optimizing delivery times and costs for products. Although specific examples and descriptions have been expressed as they might relate to the less-than-a-load freight business, the usefulness of the present invention is not intended to be limited thereto. Full load shipments of products might also be improved where redirection of the vehicle and/or portions of the load en route may be desirable to respond to customer needs or other factors.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

What is claimed is:

1. A method of routing a vehicle, the method comprising:
receiving vehicle information from a vehicle main computer and a global positioning satellite device associated with the vehicle;
scanning an image representing a shipping document comprising shipping information for at least one package utilizing a scanning device;
processing the image utilizing an image processor on board the vehicle; and generating image data from the processed image;
calculating an estimated time of arrival based at least in part on the vehicle information;
wirelessly transmitting estimated time of arrival data corresponding to the calculated estimated time of arrival to a remote processor, and wirelessly transmitting the image data to a remote processor, wherein the remote processor extracts and generates billing information in advance of arrival of the at least one package at an arrival destination;
wirelessly receiving updated route information data from the remote processor, the updated route information data based at least in part on the image data, the estimated time of arrival, or combinations thereof; and displaying a graphical representation of the updated route information data, wherein the acts of receiving, scanning, processing, calculating, transmitting and displaying are performed by an onboard device terminal.

2. The method of claim 1, wherein the vehicle information received comprises at least one of: engine temperature, oil pressure, fluid levels, tire pressure, weather condition information, speed of travel, direction of travel, and vehicle location.

3. The method of claim 1, further comprising receiving comments from a driver of the vehicle, and wirelessly transmitting the comments to the remote processor.

4. The method of claim 3, wherein the comments correspond to the shipping document.

5. The method of claim 3, wherein the comments comprise at least one of: remarks, details, error notations, corrections, and weather conditions.

6. The method of claim 1, further comprising:
accessing the image data representing the shipping document;
breaking the image data representing the shipping document into a plurality of packets, wherein the plurality of packets represent the image data; and
wirelessly transmitting the plurality of packets representing the image data to the remote processor.

7. The method of claim 6, further comprising recording a number associated with each individual packet that is received by the remote processor.

8. The method of claim 7, further comprising re-sending an individual packet of the plurality of packets that is not received by the remote processor.

* * * * *